(No Model.)
W. A. C. OAKS.
MACHINE FOR INSERTING RIVETS IN KNIFE HANDLES.
No. 326,141. Patented Sept. 15, 1885.
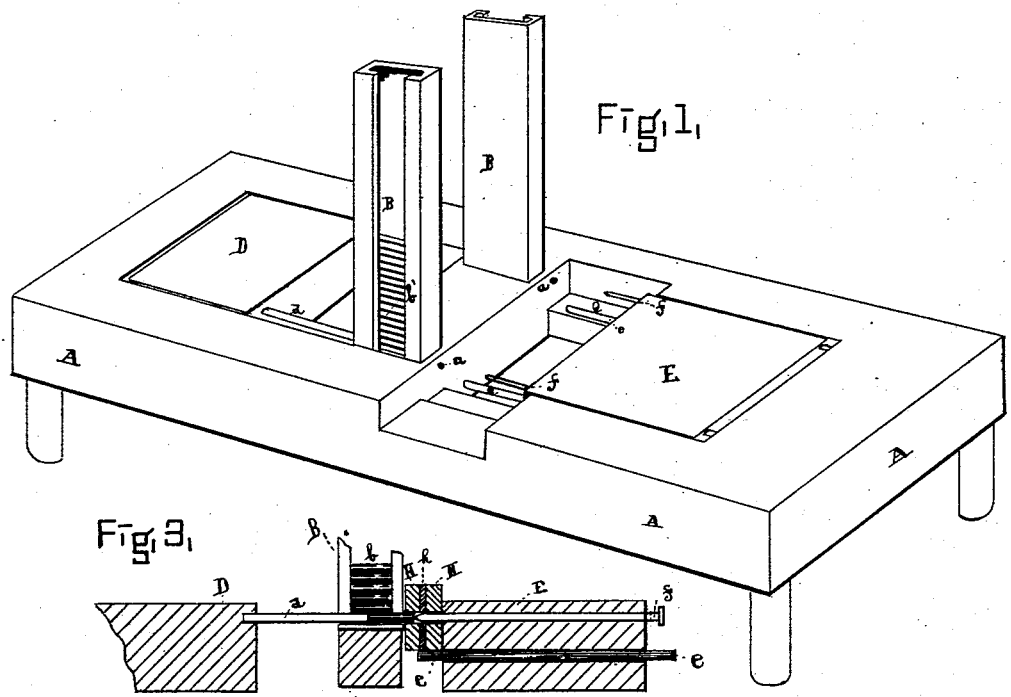
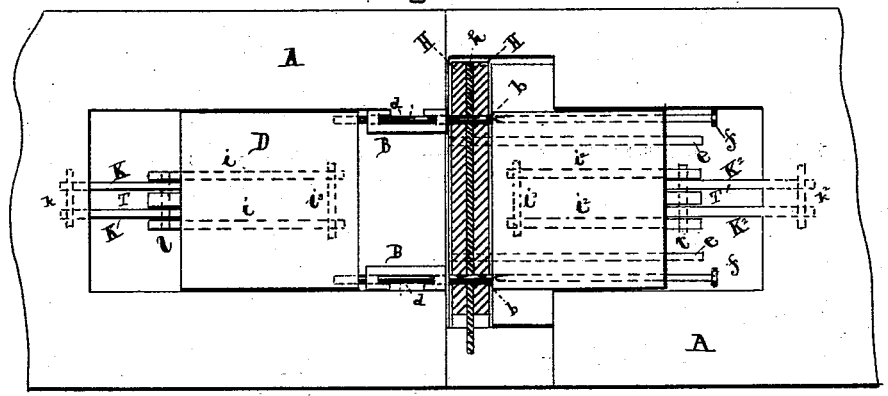
WITNESSES:
INVENTOR
W. A. C. Oaks —
BY William G. Button
his
ATTORNEY ized machine is all ready for the next handle, the

UNITED STATES PATENT OFFICE.

WILLIAM A. C. OAKS, OF ANTRIM, NEW HAMPSHIRE, ASSIGNOR TO THE GOODELL COMPANY OF ANTRIM, NEW HAMPSHIRE.

MACHINE FOR INSERTING RIVETS IN KNIFE-HANDLES.

SPECIFICATION forming part of Letters Patent No. 326,141, dated September 15, 1885.

Application filed July 17, 1885. (No model.)

*To all whom it may concern:*

Be it known that I, WILLIAM A. C. OAKS, a citizen of the United States, residing at Antrim, in the county of Hillsborough and State of New Hampshire, have invented a new and Improved Rivet-Sticking Machine, of which the following is a full and complete specification.

The object of my invention is to provide a machine to take the place of hand-work in sticking or inserting rivets in the holes already bored in the handles of knives and forks, preparatory to their being secured by riveting, either by hand or machine.

For this purpose my machine consists of a suitable frame or table carrying two uprights, forming magazines for rivets, a reciprocating table carrying the parts composing the knife-handle, and supporting them by means of two pins passing through the rivet-holes and slipping loosely in holes in the reciprocating carriage, and a second reciprocating carriage upon the opposite side of the rivet-magazines, carrying two pins to force the rivets into the holes in the knife-handle, occupied by the previously-mentioned pins, the handle being in the meantime supported by some rods also running in the reciprocating table.

In the drawings, Figure 1 is a perspective view of the machine without a knife-handle in, and with both the reciprocating carriages drawn back. Fig. 2 is a plan view of the machine, showing a knife in place and both reciprocating carriages pushed close to the reservoir with the rivets in the holes; Fig. 3, a vertical longitudinal section of the important working parts of the machine.

A is the frame of the machine. B B are the uprights, which are recessed upon the outer faces, as shown, to form magazines for the rivets. *a a* are two small holes through which the rivets are forced from the magazines to the holes in the knife-handle. *b* are the rivets.

D is a reciprocating carriage operated by an elbow-joint and a treadle, and sliding upon guides. The pins *d d* are long slender rods of the diameter of the rivets.

E is the reciprocating carriage, supporting the knife-handle by means of two pins, *f f*, passing loosely through holes in the table and terminating at the outer end in small heads. Upon these pins the parts of the knife are placed. Two pins, *e e*, below *f f*, also working loosely in holes in the table E, act to support the handle after the rivets are inserted and the pins *f f* are withdrawn.

H H are the scales of the handle; *h*, the tang of the knife; *i i*, links pivoted at *l'* to the reciprocating table D, and at *l* to the second pair of links, K K, which in turn are pivoted to the frame A at *k*. *l' l'*, *l'*, *l*, K² K², and *k²* form a similar set of links operating the table E, the exact construction of these parts being a matter of no importance.

T T' are treadles to work the link systems, and by their means the reciprocating tables D and E.

The pushing-rod *d*, the lowest rivet in the magazine B, and the pin *f* are in one right line.

The operation is as follows: The scales and the tang of the knife or fork are placed in their proper order and position upon the pins *f f* of the reciprocating table E, and this table is then pushed up against the cross-piece of the frame upon which the uprights B B rest. The other table, D, is then pressed against the cross-piece by means of a treadle and the elbow-joint motion shown, and the pushing-rods *a a*, entering the holes at the bottom of the rivet-magazine, push out the lowest rivets on each side and force them to enter the holes in the knife-handle, the rivets pushing the pointed pins *f f* before them, the knife-handle being in the meantime held up by the rods *c c*. The rivets being now properly stuck, the carriage E is drawn back and the knife taken out. The carriage D is also withdrawn, and the removal of the rods *d d* from the hole in the magazine B B permits the rivets next above them to fall to the lowest point upon each side, where they are in line with the pins, and the machine is all ready for the next handle, the pins upon which the handles are placed having been pushed out again by striking against the end of the frame upon the completion of the backward motion of the carriage E.

The above machine is shown arranged for two sets of rivets; but it is obvious that it can be easily made to stick one, two, or three or more rivets at once as may be required. It is also equally adapted to use upon knives, forks, and other similar articles by making some slight changes.

Having now fully described my invention, what I claim, and desire to secure by Letters Patent, is—

A rivet-sticking machine consisting of the combination of one or more magazines for containing a supply of rivets and two reciprocating carriages, one provided with loose pins upon which the pieces into which the rivets are to be inserted are placed, by means of previously bored holes, and a second set of loose bars or wires to support the article in which the rivets have been inserted, the other carriage having two fixed pushing-pins of the same diameter as the rivets and placed in one right line with the lowest rivet of the magazine and the supporting-pins previously mentioned, the whole operated by link-motion and treadles or other suitable devices, all substantially as shown and described.

In witness whereof I have hereunto set my hand.

WILLIAM A. C. OAKS.

Witnesses:
CHAS. S. ABBOTT,
EMMA S. McCOY.